(12) United States Patent
Handley et al.

(10) Patent No.: US 7,962,804 B2
(45) Date of Patent: Jun. 14, 2011

(54) METHOD AND SYSTEM FOR ANALYZING TIME SERIES DATA

(75) Inventors: John C. Handley, Fairport, NY (US); Sankar Virdhagriswaran, Boxborough, MA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/776,993

(22) Filed: May 10, 2010

(65) Prior Publication Data

US 2010/0223506 A1    Sep. 2, 2010

Related U.S. Application Data

(63) Continuation of application No. 11/623,345, filed on Jan. 16, 2007, now Pat. No. 7,770,072.

(51) Int. Cl.
G06F 11/00 (2006.01)
(52) U.S. Cl. .......................... 714/47; 702/183
(58) Field of Classification Search .................. 714/26, 714/47, 44; 702/183
See application file for complete search history.

(56) References Cited

U.S. PATENT DOCUMENTS

| | | | |
|---|---|---|---|
| 3,882,305 A | 5/1975 | Johnstone | |
| 4,754,409 A | 6/1988 | Ashford et al. | |
| 5,519,861 A * | 5/1996 | Ryu et al. | 701/1 |
| 6,195,103 B1 | 2/2001 | Stewart | |
| 6,397,166 B1 | 5/2002 | Leung et al. | |
| 6,526,405 B1 | 2/2003 | Mannila et al. | |
| 6,535,865 B1 * | 3/2003 | Skaaning et al. | 706/52 |
| 6,728,728 B2 | 4/2004 | Spiegler et al. | |
| 7,152,068 B2 | 12/2006 | Emery et al. | |
| 7,171,340 B2 * | 1/2007 | Brocklebank | 702/189 |
| 7,181,365 B2 | 2/2007 | Inoue et al. | |
| 7,225,245 B2 | 5/2007 | Gurumoorthy et al. | |
| 7,523,349 B2 | 4/2009 | Barras | |
| 2003/0079011 A1 | 4/2003 | Schilling et al. | |
| 2003/0200134 A1 | 10/2003 | Leonard et al. | |
| 2005/0096880 A1 | 5/2005 | Morita et al. | |
| 2005/0102107 A1 | 5/2005 | Porikli | |
| 2005/0144538 A1 | 6/2005 | Lawrence et al. | |
| 2005/0219292 A1 | 10/2005 | Koike | |
| 2006/0015294 A1 | 1/2006 | Yetter et al. | |
| 2006/0224356 A1 | 10/2006 | Castelli et al. | |
| 2007/0143089 A1 | 6/2007 | Sakai et al. | |

(Continued)

OTHER PUBLICATIONS

Smith, T.F. et al., "Identification of Common Molecular Subsequences", Journal of Molecular Biology, 1981, vol. 147, pp. 195-197.

*Primary Examiner* — Robert Beausoliel
*Assistant Examiner* — Elmira Mehrmanesh
(74) *Attorney, Agent, or Firm* — Pepper Hamilton LLP

(57) ABSTRACT

Systems and methods for performing fault analysis using numerically coded time series data are disclosed. First time series data, including a plurality of first time entries and an associated first data value for each first time entry, may be received for a machine variable for a first printer. Second time series data, including a plurality of second time entries and an associated second data value for each second time entry, may be received for the machine variable for each of a plurality of second printers. For each second printer, a similarity measurement may be determined for the first time series data for the first printer and the second time series data for the second printer. One or more closest matching second printers may be determined based on the similarity measurements. An association may be displayed between the first printer and each closest matching second printer.

6 Claims, 6 Drawing Sheets

U.S. PATENT DOCUMENTS

| | | |
|---|---|---|
| 2007/0239753 A1 | 10/2007 | Leonard |
| 2007/0299798 A1* | 12/2007 | Suyama et al. .................. 706/21 |
| 2008/0170507 A1 | 7/2008 | Handley et al. |
| 2008/0225738 A1 | 9/2008 | Virdhagriswaran et al. |
| 2009/0132626 A1 | 5/2009 | Ide |
| 2009/0216700 A1 | 8/2009 | Bouchard et al. |

* cited by examiner

METHOD AND SYSTEM FOR ANALYZING TIME SERIES DATA

The present application claims priority to U.S. patent application Ser. No. 11/623,345, entitled "Method and System for Analyzing Time Series Data," which was filed on Jan. 16, 2007 and issued as U.S. Pat. No. 7,770,072 on Aug. 3, 2010. The aforementioned patent is incorporated by reference herein, in its entirety, for all purposes.

Not Applicable

BACKGROUND

1. Technical Field

The present disclosure generally relates to systems and methods for performing data analysis. More particularly, the present disclosure relates to systems and methods for automatically determining similarities between time series of machine variable values and for enabling users to perform searches of such time series.

2. Background

Service departments or organizations that service electronic machines often use diagnostic information generated by such machines to perform fault detection and analysis. The diagnostic information may be collected using sensors or other recording mechanisms within the machine to generate various data, such as operating conditions and performance characteristics.

Fault detection and analysis is commonly performed using such diagnostic information. In most cases, fault analysis is performed either at the customer site by field engineers or at the service department if the customer brought or sent the machine for service. In either case, a service engineer examines the diagnostic information in an attempt to determine the cause of the fault.

One problem with performing fault analysis in this manner is that the service engineer only has access to a limited amount of information regarding the cause of the fault. For example, the service engineer might only have access to current diagnostic information that is stored on the machine. Even if time series data is present for the diagnostic information, the service engineer likely is only able to analyze a single time series of diagnostic information at a time.

Some machines have been provided with data network connections so that diagnostic information pertaining to a machine's internal state can be periodically transmitted to a data warehouse for storage. However, analyzing the data in the data warehouse to determine meaningful information can be difficult.

Systems and methods for enabling a user to find similarities between patterns for multiple machine variables and using such similarities to assist in fault analysis of a machine in real time would be desirable.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "code" is a reference to one or more codes and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method of performing fault analysis using numerically coded time series data from a plurality of printers may include receiving first time series data, including a plurality of first time entries and an associated first data value for each first time entry, for a machine variable for a first printer, receiving second time series data, including a plurality of second time entries and an associated second data value for each second time entry, for the machine variable for a plurality of second printers, determining, for each second printer, a similarity measurement for the first time series data for the machine variable for the first printer and the second time series data for the machine variable for the second printer, determining one or more closest matching second printers based on the similarity measurements, and displaying an association between the first printer and each closest matching second printer.

In an embodiment, a method of performing fault analysis using numerically coded time series data from a printer may include receiving time series data for a plurality of machine variables for the printer. The method may further include, for at least one machine variable, determining a plurality of similarity measurements for the machine variable, wherein each similarity measurement corresponds to a similarity between the machine variable and a second machine variable, and determining one or more closest matching machine variables for the machine variable based on the similarity measurements. The method may further include displaying an association between a particular machine variable and the one or more closest matching machine variables for the particular machine variable.

A system for performing fault analysis using numerically coded time series data from a plurality of printers may include a processor, a processor-readable storage medium in communication with the processor, and a communications interface in communication with the processor. The processor-readable storage medium may contain one or more programming instructions for performing a method of performing fault analysis using numerically coded time series data from a plurality of printers. The method may include receiving first time series data, including a plurality of first time entries and an associated first data value for each first time entry, for a machine variable for a first printer, receiving second time series data, including a plurality of second time entries and an associated second data value for each second time entry, for the machine variable for a plurality of second printers, determining, for each second printer, a similarity measurement for the first time series data for the machine variable for the first printer and the second time series data for the machine variable for the second printer, determining one or more closest matching second printers based on the similarity measurements, and displaying an association between the first printer and each closest matching second printer.

A system for performing fault analysis using numerically coded time series data from a printer may include a processor, a processor-readable storage medium in communication with the processor, and a communications interface in communication with the processor. The processor-readable storage medium may contain one or more programming instructions for performing a method of performing fault analysis using numerically coded time series data from a printer. The method may include receiving time series data for a plurality of machine variables for the printer. The method may further include, for at least one machine variable, determining a plurality of similarity measurements for the machine variable, wherein each similarity measurement corresponds to a similarity between the machine variable and a second machine variable, and determining one or more closest matching machine variables for the machine variable based on the similarity measurements. The method may further include displaying an association between a particular machine variable and the one or more closest matching machine variables for the particular machine variable.

BRIEF DESCRIPTION OF THE DRAWINGS

Aspects, features, benefits and advantages of the present invention will be apparent with regard to the following description and accompanying drawings, of which.

DETAILED DESCRIPTION

The term "machine" refers to a device used to perform an operation. Exemplary machines include print engines and other document processing devices, such as printers, scanners, facsimile machines and/or the like. A machine includes a plurality of machine variables ("codes") for which data is stored over time. Each code represents a machine state, condition and/or performance measure for the machine. For some machines, such as the DocuColor™ DC7000 and DC8000 digital presses provided by Xerox Corporation, data values may be stored for as many as approximately 9000 codes. It will be apparent to one of ordinary skill in the art that data entries for more or fewer codes may also be stored for a particular machine within the scope of the present disclosure.

The term "time series data" refers to data collected over time for a particular code. Time series data includes at least a time entry, such as a day, hour, minute, second and/or other time interval at which data is collected, and a corresponding data value recorded for each time entry. The data value may represent a particular machine state that is operative at the corresponding time entry, such as, for example and without limitation, a machine's internal temperature. Alternately, the data value may represent a value that accumulated since the previous time entry, such as, for example and without limitation, a number of operations performed by the machine, such as pages printed by a printer. The data value may be represented in a numerically coded format. In other words, each data value may represent an integer value or a fractional value. If no data is available for a particular time entry, a designation that no data was received may be substituted for the data value.

The term "similarity measure" refers to a process used to determine a value (a "similarity measurement") that represents the similarity between at least two time series data streams. Exemplary similarity measures including correlations, dynamic time warping, longest common subsequence, compression distance measure and a modified Smith-Waterman algorithm are described in detail below.

The term "closest matching" when used in reference to a time series data stream, code and/or machine variable, refers to a time series data stream, code and/or machine variable having a best similarity measurement for a particular similarity measure out of a plurality of time series data streams, codes and/or machine variables. If, for example, a determination requires returning N closest matching codes, the codes having the N best similarity measurements may be returned.

Figure 1:
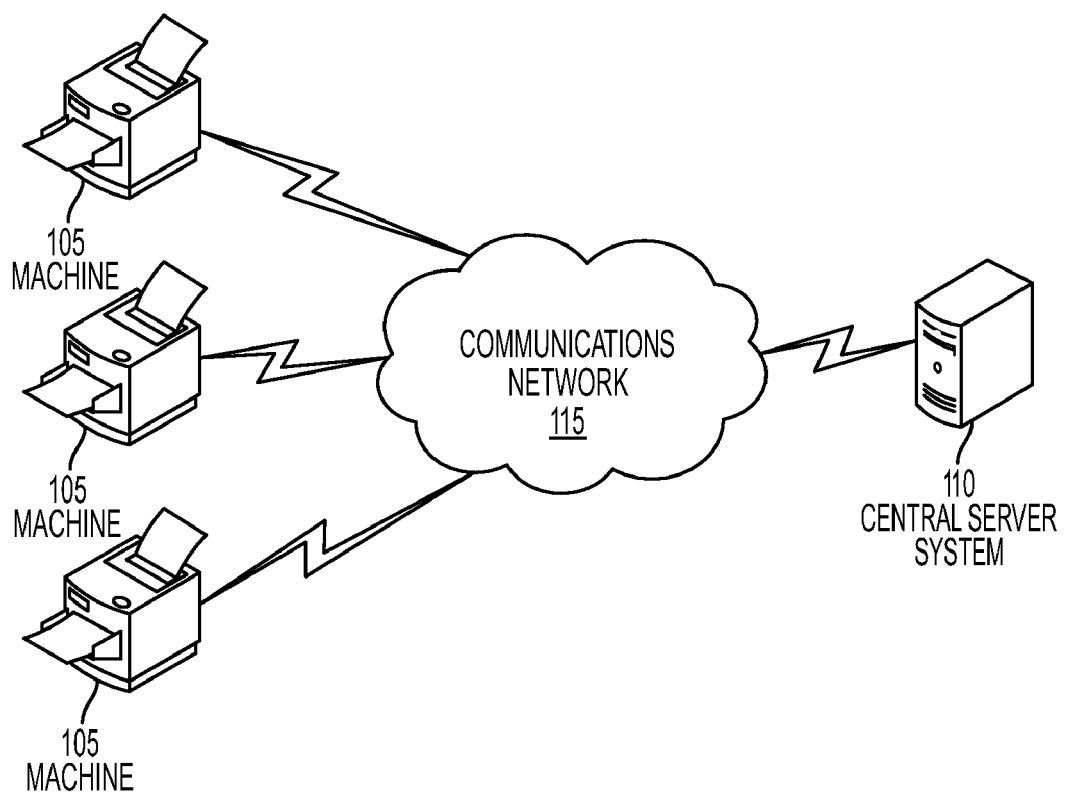
FIG. 1 depicts an exemplary system for analyzing time series data according to an embodiment.

FIG. 1 depicts an exemplary system for analyzing time series data according to an embodiment. Time series data for a plurality of codes may be received from one or more machines 105 at a central server system 110 via a communications network 115, such as the Internet, an intranet and/or the like. The central server system 110 may include a database used to store the received time series data. The database may store the time series data based on a machine serial number, which is unique to each machine 105. A machine serial number can be an alphanumeric code, a symbol based code, a binary code or any other identifier that uniquely identifies a machine 105. In an embodiment, a particular data value may be associated with the serial number for the machine 105 from which it was received and a time entry denoting when the data value was received. The database may be queried to extract time series data for each machine 105 and each code or machine variable.

Time series data for a particular code may include an array containing time entries and data values such as is shown in Table 1 below. Data values may have a value of "NA" when no data is present for the corresponding time entry. Although time entries are shown in Table 1 on a daily basis, data values received at any time interval may be stored in a database within the scope of the present disclosure as will be apparent to one of ordinary skill in the art.

TABLE 1

| TIME ENTRY | DATA VALUE |
|---|---|
| "2006-10-01" | 7205 |
| "2006-10-02" | 7203 |
| "2006-10-03" | 7201 |
| "2006-10-04" | NA |
| "2006-10-05" | NA |
| "2006-10-06" | 7200 |
| "2006-10-07" | 7200 |
| "2006-10-08" | 7199 |
| "2006-10-09" | 7198 |
| "2006-10-10" | 7199 |
| "2006-10-11" | 7199 |
| "2006-10-12" | NA |
| "2006-10-13" | 7200 |
| "2006-10-14" | 7197 |
| "2006-10-15" | NA |
| "2006-10-16" | 7197 |
| "2006-10-17" | 7200 |
| "2006-10-18" | NA |
| "2006-10-19" | NA |
| "2006-10-20" | 7199 |
| "2006-10-21" | NA |
| "2006-10-22" | 7197 |
| "2006-10-23" | 7198 |

For some machines 105, less than all codes may exhibit changes over time. Time series which do not exhibit changes may be termed "constant time series." Codes exhibiting changes may be termed "non-constant time series." In an embodiment, constant time series may not be considered when evaluating a similarity measure. In an embodiment, only non-constant time series may be received from a machine 105.

A similarity measure between time series may output a first value if data values for, for example, two time series are exactly (or very nearly) the same. The similarity measure may further output a second value if data values for the two time series are very different.

Similarity (or, conversely, difference) may be determined based on, for example, whether data values for the two time series are equal over time or whether data values for the two time series change by proportionate amounts between time entries. The similarity measure may take into account data entries in a plurality of time intervals of, for example, equal duration for at least one time series when determining the similarity or difference between the time series. Exemplary similarity measures are described below.

The database to support querying similarities between time series data may include a table containing a plurality of fields, such as fields that contain a machine serial number, a code and a variable length array. The variable length array may include a list of the n most similar (i.e., closest matching) codes for the particular code on the machine 105 having the particular serial number and the similarity measurements for the n most similar codes in, for example, decreasing order. As such, a query that supplies a machine serial number and a code may be able to retrieve the corresponding variable length array, extract one or more codes, of one or more similar time series and present the time series data for such codes for time series data retrieval and display.

In an embodiment, if a plurality of time intervals are considered, the list of the n closest matching codes may include, for example, a code and a start time and/or an end time associated with the time interval. In an embodiment, a duration for the time interval of the closest matching code may be associated with an entry in the closest matching list. Other methods of representing codes may be performed within the scope of this disclosure.

In an embodiment, the list of the n closest matching codes may be determined by calculating pairwise similarity measurements between all non-constant time series at or about the time that the database is loaded with time series data. For example, each of a plurality of machines 105 may be programmed to provide non-constant time series data to the central server system 110 at a pre-determined time interval. Upon receiving the non-constant time series data from each machine 105, the central server system 110 may perform the pairwise comparisons for each code and store the n closest matching codes in the database. As such, the database may allow for near real-time retrieval and searching using a query interface.

In an embodiment, a pairwise comparison may not be performed for different codes on different machines 105. In other words, pairwise comparisons between codes on different machines 105 may only be performed on a code-by-code basis.

In an embodiment, a similarity database may be generated using codes from a single machine 105. For example, each code (or each code having a non-constant time series) on a particular machine 105 may be pairwise compared with other codes on the same machine to determine the n closest matching codes. The resulting information may be stored locally on the machine 105 and/or at a central server system 110. Such information, if stored on the machine 105, may be accessible by a service engineer locally or remotely via a communications network 115.

Any of a plurality of similarity measures may be used to perform the pairwise comparisons. Exemplary similarity measures may include a correlation, a dynamic time warping, longest common subsequence, compression distance measure and a modified Smith-Waterman algorithm. Methods of performing each of these similarity measures are described below.

In an embodiment, the values of each time series may be scaled to values between, for example, 0 and 1, inclusive, prior to performing a similarity calculation. For example, each value of a time series X (i.e., $X_i$ for times i=1 to n) may be scaled using the following formula:

$$\frac{X_i - \min(X_i)}{\max(X_i) - \min(X_i)},$$

where $\min(X_i)$ and $\max(X_i)$ are the minimum and maximum values of $X_i$ in time series X, respectively. Different scales, such as values representing percentages between a minimum value and a maximum value, values between 0 and 10, inclusive, and the like, may also be used within the scope of this disclosure as will be apparent to one of ordinary skill in the art.

Prior to performing a similarity calculation, missing values (represented by 'NA') may be imputed by replacing a missing value at time i with a value of the time series that is nearest in time to time i. Other methods of imputation, such as regression methods, weighted sums, expectation-maximization, interpolation and the like, may alternately be used within the scope of this disclosure as will be apparent to those of ordinary skill in the art.

A correlation may measure the similarity between two codes if the codes operate over a common time frame. As such, determining correlations between codes may be particularly effective when comparing two codes on the same machine 105. A correlation may be determined using the following formula:

$$d(X, Y) = \frac{\sum_{i=1}^{n}(X_i - \overline{X})(Y_i - \overline{Y})}{\sqrt{\sum_{i=1}^{n}(X_i - \overline{X})^2 \sum_{i=1}^{n}(Y_i - \overline{Y})^2}},$$

where $X_i$ and $Y_i$ are time series data entries at time i for time series X and Y, respectively; and $\overline{X}$ and $\overline{Y}$ are the averages of the data values in time series X and Y, respectively.

Dynamic time warping is an algorithm for measuring similarity between two sequences which may vary in time and/or frequency. Dynamic time warping may enable an optimal match to be determined between two given sequences (e.g., time series data). Time series may be "warped" in the time dimension to determine a measure of their similarity independent of non-linear variations in the time dimension.

Figure 2:
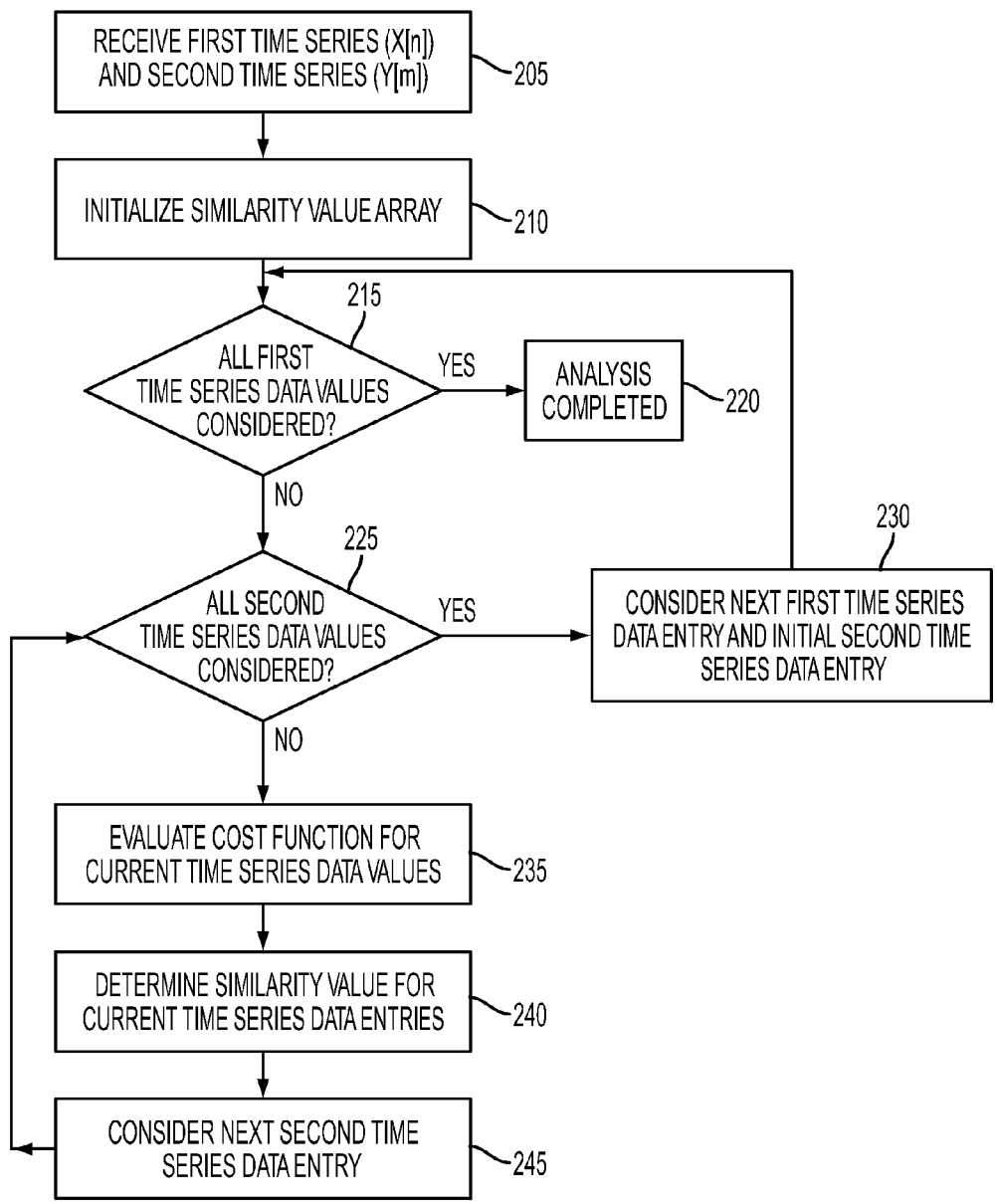
FIG. 2 depicts a flow diagram of an exemplary method for performing dynamic time warping according to an embodiment.

FIG. 2 depicts a flow diagram of an exemplary method for performing dynamic time warping according to an embodiment. As shown in FIG. 2, a first time series X having n entries and a second time series Y having m entries may be received 205. The data value of the $i^{th}$ entry of the first time series may be depicted as X[i], and the data value of the $j^{th}$ entry of the second time series may be depicted as Y[j]. An array of similarity values, of size n×m (i.e., DTW[n,m]), may be initialized 210 such that DTW[0,0]=0, DTW[i, 0]=DTW[i−1, 0]+X[i], for i=1 to n, and DTW[0,j]=DTW[0,j−1]+Y[j], for j=1 to m. A determination may be made 215 as to whether all entries in the first time series have been considered. If so, the dynamic time warping process may be completed 220. In an embodiment, the value of DTW[n,m] may be returned. In an alternate embodiment, the value of DTW[n,m] divided by the greater of two scaling values (discussed further hereinbelow).

Otherwise, a determination may be made 225 as to whether all entries in the second time series have been considered. If all entries in the second time series have been considered, the current entry of the first time series may be incremented 230 by one (X[i+1]), the current entry of the second time series may be set to one (Y[1]), and the process may return to 215. If not, a cost function may be evaluated 235 using the data value for a current entry in the first time series (X[i]) and the data value for a current entry in the second time series (Y[j]). A similarity value corresponding to the current entry in the first time series and the current entry in the second time series (DTW[i,j]) may then be determined 240 by summing the output of the cost function with the minimum of (i) the similarity value corresponding to the previous entry in the first time series and the current entry in the second time series (DTW[i−1,j]); (ii) the similarity value corresponding to the current entry in the first time series and the previous entry in the second time series (DTW[i,j−1]); and (iii) the similarity value corresponding to the previous entry in the first time series and the previous entry in the second time series (DTW [i−1, j−1]). The current entry of the second time series may then be incremented 245 by one and the process may return to 225.

DTW scores may be converted to a scaled similarity measure between 0 and 1 (where a value of 1 means that the time series, when scaled, are identical) by computing two quantities used to scale DTW[n,m]. The first value, mx, may represent the cost of warping time series X to a single point and reconstructing time series Y. The second value, my, may represent the cost of warping time series Y to a single point and reconstructing time series X. The maximum value achievable by the DTW algorithm may be the maximum of these two values (i.e., maximum(mx,my)). This quantity may be used to scale DTW[n,m] to a value between 0 and 1. If the scaled value of DTW[n,m] equals 0, the distance between X and Y may be zero. The scaled value may then be subtracted from 1 in order to convert it to a similarity value (i.e., where a value of 1 denotes complete similarity).

The above method may be implemented using the following pseudocode:

```
int DTWDistance(float X[1..n], float Y[1..m], float f[1..n, 1..m]) {
    declare int DTW[0..n, 0..m], i, j, cost
    DTW[0, 0] = 0
    for i := 1 to n
        DTW[i, 0] = DTW[i−1, 0] + X[i]
    for i := 1 to m
        DTW[0, i] = DTW[0, i−1] + Y[i]
    for i := 1 to n
        for j = 1 to m
            cost = f[X[i], Y[j]]
            DTW[i, j] = minimum(DTW[i − 1, j] + cost,
                                DTW[i, j − 1] + cost,
                                DTW[i − 1, j − 1] + cost)
    mx = 0
    my = 0
    for i := 1 to n
        mx = mx + f[X[i], Y[m]]
        my = my + f[X[i], Y[1]]
    for i := 1 to m
        mx = mx + f[X[1], Y[i]]
        my = my + f[X[n], Y[i]]
    return 1 − DTW[n, m] / maximum(mx, my)}
```

The above algorithm is merely exemplary. Alternate algorithms known by those of ordinary skill in the art may also be used to perform dynamic time warping and will be apparent based on this disclosure.

Figure 3:
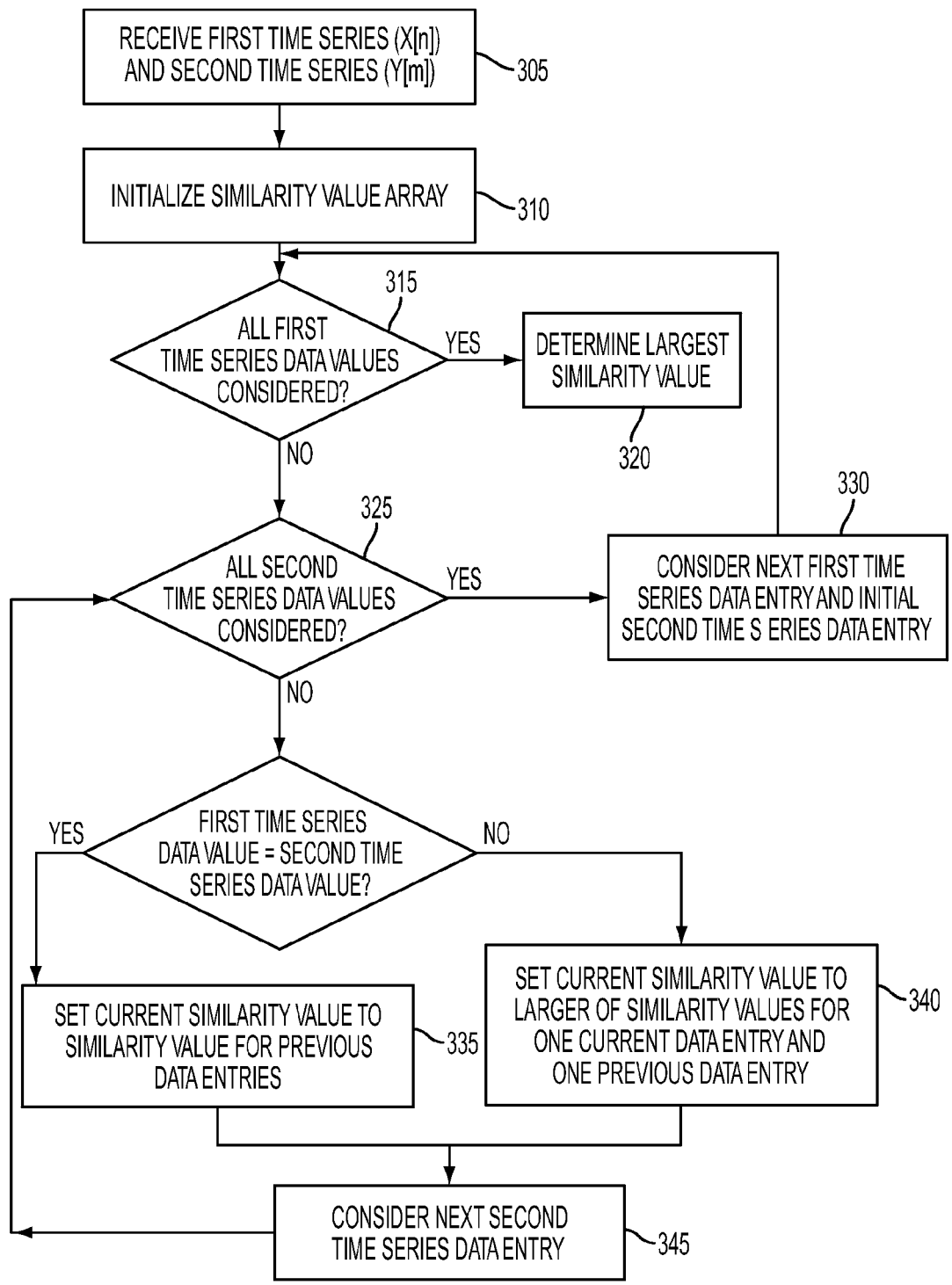
FIG. 3 depicts a flow diagram of an exemplary method for determining a longest common subsequence (LCS) according to an embodiment.

FIG. 3 depicts a flow diagram of an exemplary method for determining a longest common subsequence (LCS) according to an embodiment. As depicted in FIG. 3, a first time series X having n entries and a second time series Y having m entries may be received 305. The data value of the $i^{th}$ entry of the first time series may be depicted as X[i], and the data value of the $j^{th}$ entry of the second time series may be depicted as Y[j]. Each entry in an array of similarity values, of size n×m (i.e., LCS[n,m]), may be initialized 310 to zero. A determination may be made 315 as to whether all entries in the first time series have been considered. If so, all similarity values have been determined for each combination of a first time entry and a second time entry. A largest similarity value may then be determined 320. The largest similarity value may represent an end point of a longest common subsequence between the first and second time series.

Otherwise, a determination may be made 325 as to whether all entries in the second time series have been considered. If all entries in the second time series have been considered, the current entry of the first time series may be incremented 330 by one, the current entry of the second time series may be set to one and the process may return to step 315. Otherwise, if the data value of the current entry of the first time series (X[i]) equals the data value of the current entry of the second time series (Y[j]), the similarity value for the current entries of the two time series (i.e., LCS[i,j]) may be set 335 to one more than the similarity value for the previous entries of the two time series (i.e., LCS[i−1,j−1+1]). Otherwise, the similarity value for the current entries of the two time series may be set 340 to the greater of (i) the similarity value for the current entry of the first time series and the previous entry of the second time series (i.e., LCS[i,j−1]) and (ii) the similarity value for the previous entry of the first time series and the current entry of the second time series (i.e., LCS[i−1,j]). The current entry of the second time series may then be incremented 345 by one and the process may return to 325.

The above method may be implemented using the following pseudocode:

```
LCS-Delta(X[1..n], Y[1..m]) {
    for i = 1 to n
        LCS[i, 0] = 0
    for j = 1 to m
        LCS[0, j] = 0
    for i = 1 to n
        for j = 1 to m
            if (X[i] = Y[j])
                LCS[i, j] = LCS[i − 1, j − 1] + 1
            else
                LCS[i, j] = max(LCS[i, j − 1], LCS[i − 1, j])
            endif
    return LCS}
```

Figure 4:
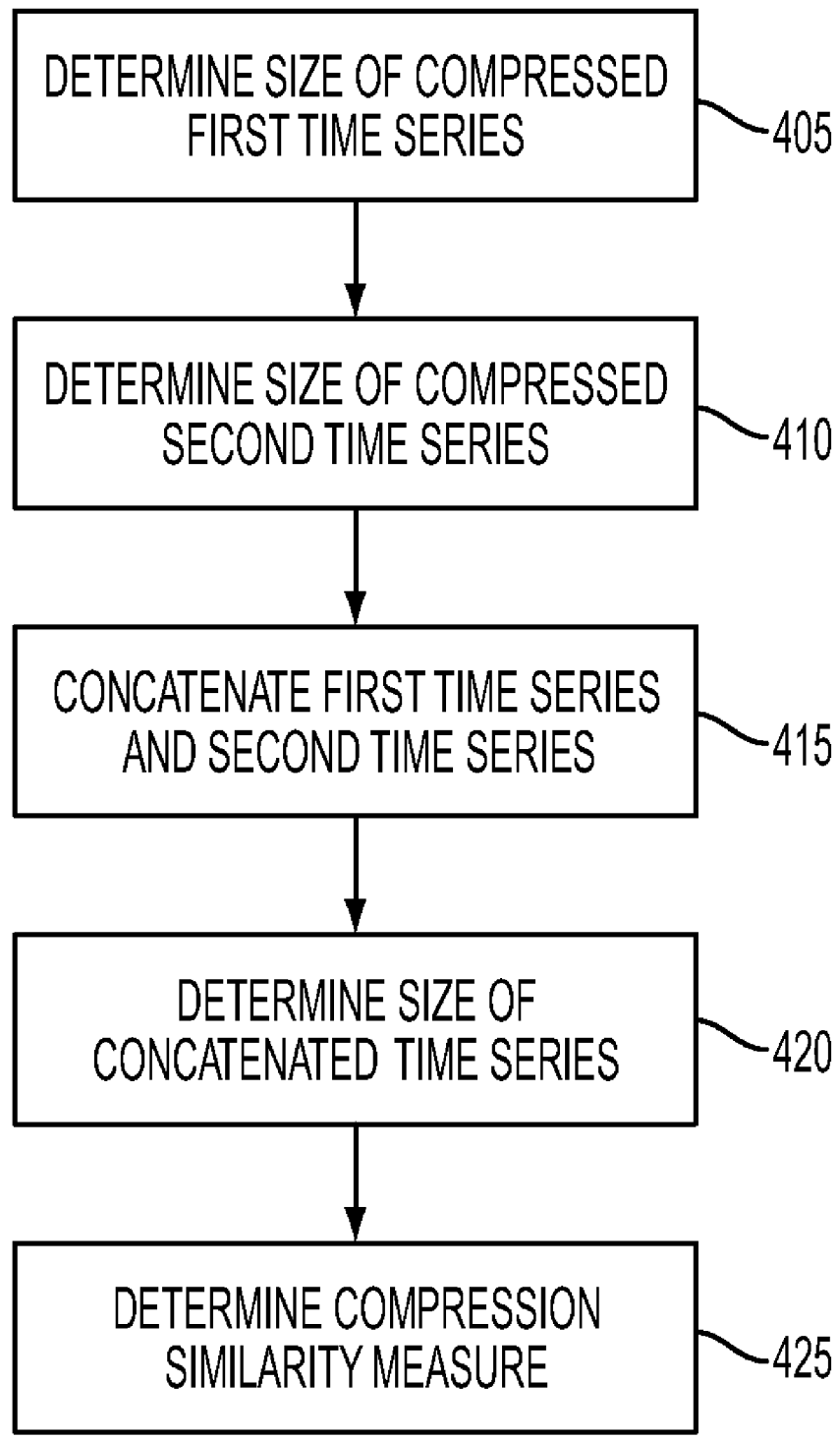
FIG. 4 depicts a flow diagram of an exemplary method for calculating a compression distance measure according to an embodiment.

FIG. 4 depicts a flow diagram of an exemplary method for calculating a compression distance measure according to an embodiment. A compression distance measure (CDM) may represent a calculation based on the sizes of time series when compressed. In an embodiment, compression may be performed using a lossless compression algorithm. As shown in FIG. 4, the size of a first time series X when compressed may be determined 405. This size may be represented as C(X). Similarly, the size of a second time series V when compressed may be determined 410 and may be represented as C(Y). The two time series may then be concatenated 415 to form a new time series XY. The size of the concatenated time series XY may then be determined 420 and represented as C(XY). The CDM may be determined 425 using the following equation:

$$CDM(X, Y) = \frac{C(XY)}{C(X) + C(Y)}.$$

If CDM(X,Y) is approximately equal to one, the two time series may be determined to be substantially unrelated. Smaller values of CDM(X,Y) may denote that the two time series are more closely related than larger values of CDM(X, Y).

Figure 5:
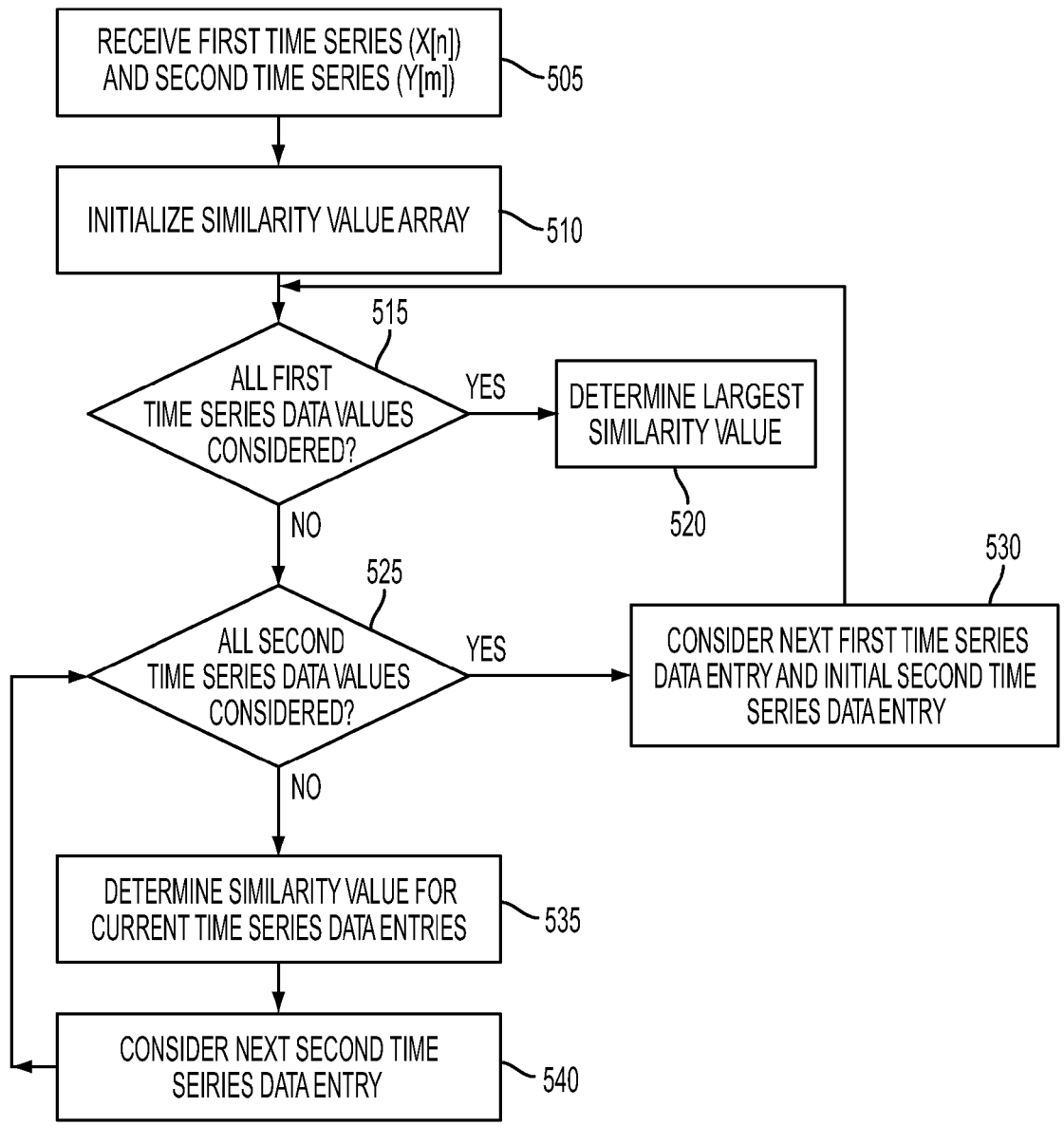
FIG. 5 depicts a flow diagram of an exemplary method for performing a modified Smith Waterman algorithm according to an embodiment.

FIG. 5 depicts a flow diagram of an exemplary method for performing a modified Smith Waterman algorithm according to an embodiment. The Smith Waterman algorithm may be used to find substrings that most closely match a particular string. Typically, such an algorithm is used in bioinformatics to identify gene sequences. However, the algorithm may be modified to incorporate the distance between entries for two time series instead of a substitution cost between two gene symbols.

As depicted in FIG. 5, a first time series X having it entries and a second time series Y having m entries may be received 505. The data value of the $i^{th}$ entry of the first time series may be depicted as X[i], and the data value of the $j^{th}$ entry of the second time series may be depicted as Y[j]. X[1] and Y[1] may represent initial time entries for the first and second time series, respectively. An array of similarity values, of size n×m in (i.e., SW [n,m]), may be initialized 510 such that SW[i, 1], for each i=1 to n, is set to $1-(X[i]-Y[1])^2$ and SW[1,j], for each j=1 to m, is set to $1-(X[1]-Y[j])^2$. A determination may be made 515 as to whether all entries in the first time series have been considered. If so, all similarity values have been determined for each combination of a first time entry and a second time entry. A largest similarity value may then be determined 520. The largest similarity value may be the maximum value in SW. In an embodiment, the largest similarity value may be divided by the lesser of in and n in order to scale the value before being returned. The largest similarity value may represent an end point of a subsequence of each of the first and second time series representing a closest match.

Otherwise, a determination may be made 525 as to whether all entries in the second time series have been considered. If all entries in the second time series have been considered, the current entry of the first time series may be incremented 530 by one, the current entry of the second time series may be set to two and the process may return to step 515. Otherwise, the similarity value for the current entries of the two time series may be set 535 to, for example, the largest of (i) zero; (ii) the sum of the similarity value for the previous entries of the first and second time series (i.e., SW[i−1,j−1]) and $1-(X[i]-Y[j])^2$; (iii) the maximum similarity value for all previously computed similarity values in the $i^{th}$ column (i.e., max(SW[i, 1 to j−1])) plus a penalty value, such as, for example, −1; and (iv) the maximum similarity value for all previously computed similarity values in the $j^{th}$ row (i.e., max(SW[1 to i−1, j])) plus the penalty value. The current entry of the second time series may then be incremented 540 by one and the process may return to 525.

The above method may be implemented using the following pseudocode (alternate Penalty values may be used within the scope of this disclosure):

```
SW-Algorithm (float X[1..n], float Y[1..m]) {
  Penalty = −1
  for i = 1 to n
    SW[i, 1] = 1 − (X[i] − Y[1])²
  for j = 1 to m
    SW[1, j] = 1 − (X[1] − Y[j])²
  for i = 2 to n
    for j = 2 to m
      s = 1 − (X[i] − Y[j])²
      Hkk = maximum(SW[i, 1 : (j − 1)]
      Hll = maximum(SW[1 : (i − 1), j]
      SW[i, j] = maximum(0, SW[i − 1, j − 1] + s, Hkk + Penalty,
      Hll +Penalty)
  return maximum(SW) / minimum(m, n)}
```

Figure 6:
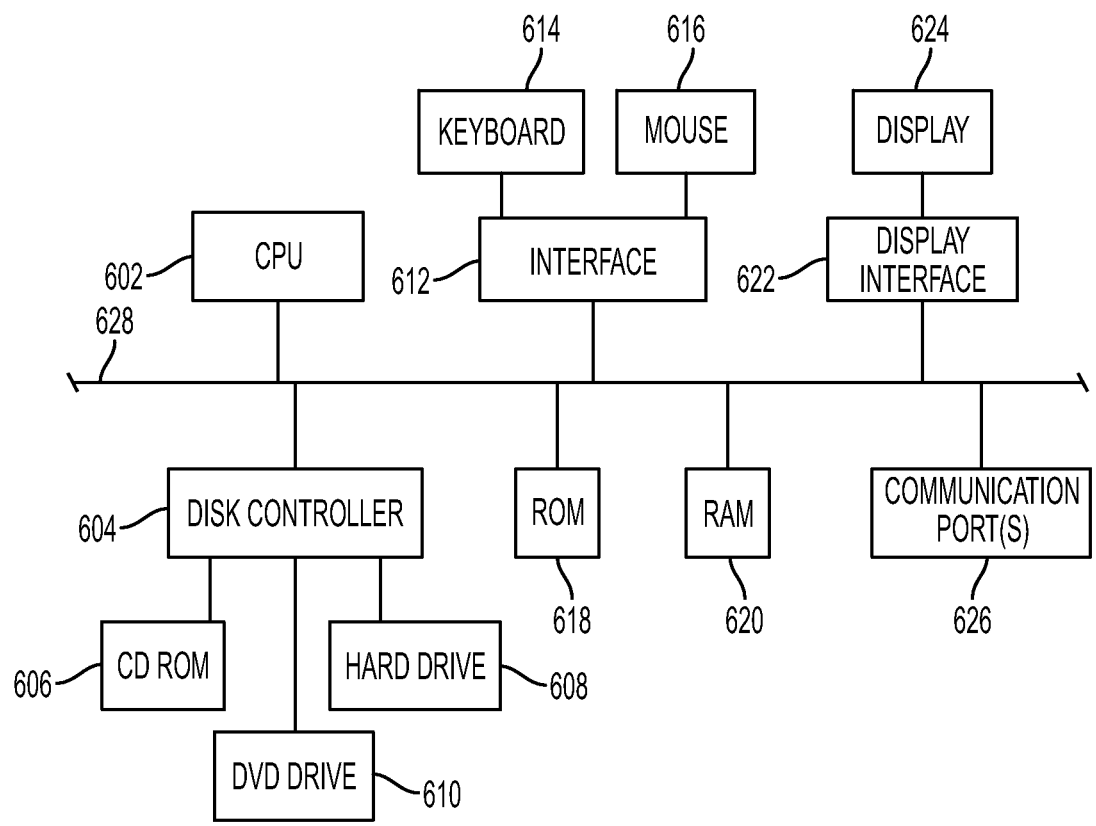
FIG. 6 is a block diagram of exemplary internal hardware that may be used to contain or implement the program instructions according to an embodiment.

FIG. 6 is a block diagram of exemplary internal hardware that may be used to contain or implement the program instructions according to an embodiment. Referring to FIG. 6, a bus 628 serves as the main information highway interconnecting the other illustrated components of the hardware. CPU 602 is the central processing unit of the system, performing calculations and logic operations required to execute a program. Read only memory (ROM) 618 and random access memory (RAM) 620 constitute exemplary memory devices.

A disk controller 604 interfaces with one or more optional disk drives to the system bus 628. These disk drives may include, for example, external or internal DVD drives 610, CD ROM drives 606 or hard drives 608. As indicated previously, these various disk drives and disk controllers are optional devices.

Program instructions may be stored in the ROM 618 and/or the RAM 620. Optionally, program instructions may be stored on a computer readable medium such as a compact disk or a digital disk or other recording medium, a communications signal or a carrier wave.

An optional display interface 622 may permit information from the bus 628 to be displayed on the display 624 in audio, graphic or alphanumeric format. Communication with external devices, such as machines 105, may occur using various communication ports 626. An exemplary communication port 626 may be attached to a communications network 115, such as the Internet or an intranet.

In addition to the standard computer-type components, the hardware may also include an interface 612 which allows for receipt of data from input devices such as a keyboard 614 or other input device 616 such as a remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of performing fault analysis using numerically coded time series data from a plurality of printers, the method comprising:

receiving first time series data for a machine variable for a first printer, wherein the first time series data comprises a plurality of first time entries and an associated first data value for each first time entry;

receiving second time series data for the machine variable for a plurality of second printers, wherein the second time series data comprises a plurality of second time entries and an associated second data value for each second time entry;

for each second printer:
  initializing one or more similarity values,
  for each first time entry in the first time series data:
    for each second time entry in the second time series data:
      evaluating a cost function based on the first data value associated with the first time entry and the second data value associated with the second time entry to determine a cost value,
      calculating a minimum similarity value from one or more previously calculated similarity values,
      summing the minimum similarity value and the cost value to produce a similarity value associated with the first time entry and the second time entry, and
      storing the similarity value associated with the first time entry and the second time entry, and
    setting the similarity measurement to the similarity value associated with the last first time entry and the last second time entry;

determining one or more closest matching second printers based on the similarity measurements; and displaying an association between the first printer and each closest matching second printer.

2. A method of performing fault analysis using numerically coded time series data from a plurality of printers, the method comprising:

receiving first time series data for a machine variable for a first printer, wherein the first time series data comprises a plurality of first time entries and an associated first data value for each first time entry;

receiving second time series data for the machine variable for a plurality of second printers, wherein the second time series data comprises a plurality of second time entries and an associated second data value for each second time entry;

for each second printer:
  initializing one or more similarity values,
  for each first time entry in the first time series data:
    for each second time entry in the second time series data:
      determining whether the data value for the first time entry equals the data value for the second time entry,
      if so, setting the similarity value associated with the first time entry and the second time entry to the sum of one and the similarity value associated with the time entry preceding the first time entry and the time entry preceding the second time entry, and
      if not, setting the similarity value associated with the first time entry and the second time entry to the maximum of the similarity value associated with the time entry preceding the first time entry and the second time entry and the similarity value associated with the first time entry and the time entry preceding the second time entry, and
    setting the similarity measurement to the similarity value associated with the last first time entry and the last second time entry;

determining one or more closest matching second printers based on the similarity measurements; and displaying an association between the first printer and each closest matching second printer.

3. A method of performing fault analysis using numerically coded time series data from a plurality of printers, the method comprising:

receiving first time series data for a machine variable for a first printer, wherein the first time series data comprises a plurality of first time entries and an associated first data value for each first time entry;

receiving second time series data for the machine variable for a plurality of second printers, wherein the second time series data comprises a plurality of second time entries and an associated second data value for each second time entry;

for each second printer:
  compressing the first time series data,
  determining a first value, wherein the first value comprises a size of the compressed first time series data,
  compressing the second time series data,
  determining a second value, wherein the second value comprises a size of the compressed second time series data,
  concatenating the first time series data and the second time series data to produce concatenated time series data,
  compressing the concatenated time series data,
  determining a third value, wherein the third value comprises a size of the compressed concatenated time series data, and
  setting the similarity measurement to the third value divided by the sum of the first value and the second value;

determining one or more closest matching second printers based on the similarity measurements; and displaying an association between the first printer and each closest matching second printer.

4. A system for performing fault analysis using numerically coded time series data from a plurality of printers, the system comprising:

a processor;

a processor-readable storage medium in communication with the processor; and a communications interface in communication with the processor, wherein the processor-readable storage medium contains one or more programming instructions for performing a method of performing fault analysis using numerically coded time series data from a plurality of printers, the method comprising:

receiving first time series data for a machine variable for a first printer via the communications interface, wherein the first time series data comprises a plurality of first time entries and an associated first data value for each first time entry, receiving second time series data for the machine variable for a plurality of second printers via the communications interface, wherein the second time series data comprises a plurality of second time entries and an associated second data value for each second time entry, for each second printer:
   initializing one or more similarity values;
   for each first time entry in the first time series data:
      for each second time entry in the second time series data:
         evaluating a cost function based on the first data value associated with the first time entry and the second data value associated with the second time entry to determine a cost value,
         calculating a minimum similarity value from one or more previously calculated similarity values,
         summing the minimum similarity value and the cost value to produce a similarity value associated with the first time entry and the second time entry, and
         storing the similarity value associated with the first time entry and the second time entry; and
      setting the similarity measurement to the similarity value associated with the last first time entry and the last second time entry,
   determining one or more closest matching second printers based on the similarity measurements, and
   displaying an association between the first printer and each closest matching second printer.

5. A system for performing fault analysis using numerically coded time series data from a plurality of printers, the system comprising:
   a processor;
   a processor-readable storage medium in communication with the processor; and
   a communications interface in communication with the processor,
   wherein the processor-readable storage medium contains one or more programming instructions for performing a method of performing fault analysis using numerically coded time series data from a plurality of printers, the method comprising:
      receiving first time series data for a machine variable for a first printer via the communications interface, wherein the first time series data comprises a plurality of first time entries and an associated first data value for each first time entry,
      receiving second time series data for the machine variable for a plurality of second printers via the communications interface, wherein the second time series data comprises a plurality of second time entries and an associated second data value for each second time entry,
      for each second printer:
         initializing one or more similarity values;
         for each first time entry in the first time series data:
            for each second time entry in the second time series data:
               determining whether the data value for the first time entry equals the data value for the second time entry,
               if so, setting the similarity value associated with the first time entry and the second time entry to the sum of one and the similarity value associated with the time entry preceding the first time entry and the time entry preceding the second time entry, and
               if not, setting the similarity value associated with the first time entry and the second time entry to the maximum of the similarity value associated with the time entry preceding the first time entry and the second time entry and the similarity value associated with the first time entry and the time entry preceding the second time entry; and
            setting the similarity measurement to the similarity value associated with the last first time entry and the last second time entry,
         determining one or more closest matching second printers based on the similarity measurements, and
         displaying an association between the first printer and each closest matching second printer.

6. A system for performing fault analysis using numerically coded time series data from a plurality of printers, the system comprising:
   a processor;
   a processor-readable storage medium in communication with the processor; and
   a communications interface in communication with the processor,
   wherein the processor-readable storage medium contains one or more programming instructions for performing a method of performing fault analysis using numerically coded time series data from a plurality of printers, the method comprising:
      receiving first time series data for a machine variable for a first printer via the communications interface, wherein the first time series data comprises a plurality of first time entries and an associated first data value for each first time entry,
      receiving second time series data for the machine variable for a plurality of second printers via the communications interface, wherein the second time series data comprises a plurality of second time entries and an associated second data value for each second time entry,
      for each second printer:
         compressing the first time series data,
         determining a first value, wherein the first value comprises a size of the compressed first time series data,
         compressing the second time series data,
         determining a second value, wherein the second value comprises a size of the compressed second time series data,
         concatenating the first time series data and the second time series data to produce concatenated time series data,
         compressing the concatenated time series data,
         determining a third value, wherein the third value comprises a size of the compressed concatenated time series data, and
         setting the similarity measurement to the third value divided by the sum of the first value and the second value,
      determining one or more closest matching second printers based on the similarity measurements, and
      displaying an association between the first printer and each closest matching second printer.

* * * * *